(No Model.)

F. E. FISHER.
ANNUNCIATOR.

No. 442,029.  Patented Dec. 2, 1890.

Witnesses

Inventor

UNITED STATES PATENT OFFICE.

FRANK E. FISHER, OF DETROIT, MICHIGAN.

ANNUNCIATOR.

SPECIFICATION forming part of Letters Patent No. 442,029, dated December 2, 1890.

Application filed July 7, 1890. Serial No. 357,956. (No model.)

*To all whom it may concern:*

Be it known that I, FRANK E. FISHER, of Detroit, in the county of Wayne and State of Michigan, have invented a new and useful Improvement in Annunciators, of which the following is a specification.

My invention consists in an improvement in annunciators hereinafter fully described and claimed.

Figure 2:
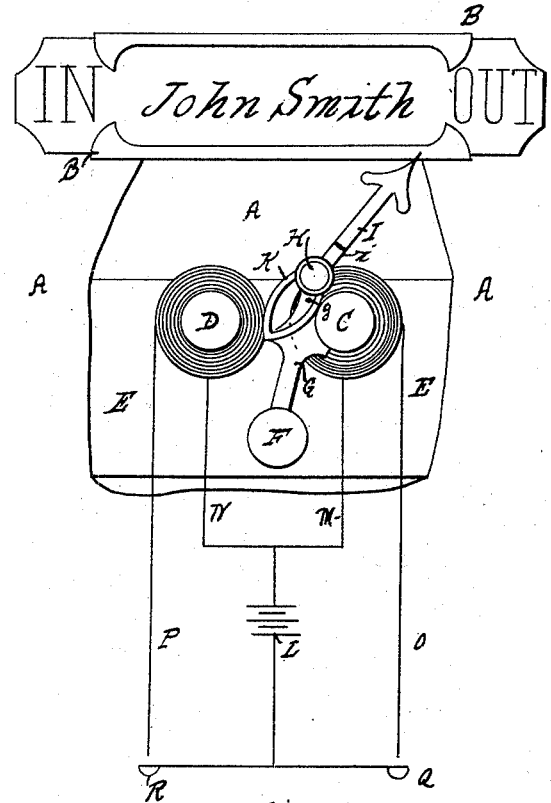
Figure 1:
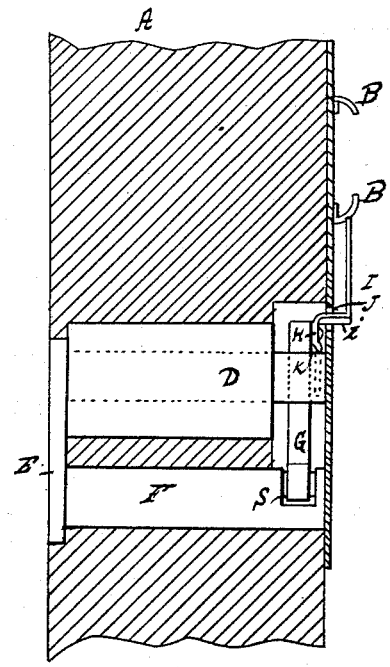

Figure 1 is a vertical section, and Fig. 2 is a front elevation.

My invention is designed more particularly for that class of machines in which a single pointer is intended to indicate either of two words or of two numbers, so that considerable throw is required.

A represents the base of the machine, in which are secured two electro-magnets C and D, secured together by being set on a metal plate E. F represents a post projecting from said metal plate under and between the electro-magnets C D, at the end of which is pivoted on a pin S an armature G, whose upper end is adapted to be attracted by whichever of the magnets C or D is energized. One end of the bobbin of each magnet is connected by conductors N M with one pole of a battery L, the other pole of which is connected to the center of an ordinary double push-button represented by R and Q, the end R being adapted to make contact with the conductor P, running to the other end of the bobbin of electro-magnet D, and the end Q being adapted to make contact with the conductor O, running to the other end of the bobbin in electro-magnet C.

So far the invention is old and well understood.

The indicator which I have illustrated consists of a card held in a suitable support B, bearing the name "John Smith" in the center and the word "In" at the left and "Out" at the right, and the action of my invention is to cause the pointer to indicate either the words "In" or "Out" with a comparatively small motion of the armature G. For this purpose the pointer I is pivoted at the point H to the end of the armature G, and is extended in substantially the form of an ellipse below the pivot H, as shown at K, a small pin $g$, set in armature G within the ellipse K, serving to limit the motion of said pointer. For the purpose of concealing the mechanism it will sometimes be advisable to bend the pointer I above the pivot H forward and upward, as shown at $i$, Fig. 1.

The operation of my invention is as follows: When the end Q of the push-button is pressed, the magnet C is energized, which core attracts the armature G and throws said armature over in contact with said core. As the effective field of force of a small magnet is small and decreases very rapidly, this would necessitate making the armature G very long if its end were the point in order to attain any considerable range of motion; but as the armature swings into the position shown in Fig. 2 the lower end K of the pointer I strikes against the core of magnet C and is thrown toward magnet D, thus giving the indicating end of the pointer a comparatively large motion in the direction of the motion of armature G. The enlarged end K of pointer I may be omitted, and the pointer I permitted to travel by its momentum after armature G comes to rest, but this is not as positive as it is to have the enlarged end K strike against the core of the magnet. When magnet D is energized the reverse operation occurs.

What I claim as my invention, and desire to secure by Letters Patent, is—

1. In combination with two electro-magnets and an armature adapted to vibrate between them, a pointer pivoted on said armature, substantially as shown and described.

2. In combination with the two electro-magnets and the interposed vibrating armature G, the pointer I, pivoted on the end of the armature and having the extension K below the pivot, substantially as and for the purposes set forth.

3. In an annunciator, the combination of the electro-magnets C and D, a pivoted armature G, adapted to vibrate between the poles of said electro-magnets, and an indicating-pointer pivoted on said armature and having the enlarged end K, substantially as shown and described.

FRANK E. FISHER.

Witnesses:
HENRY B. LOTHROP,
GERTRUDE H. ANDERSON.